United States Patent [19]

Metcalfe

[11] Patent Number: 4,989,904
[45] Date of Patent: Feb. 5, 1991

[54] CONNECTOR FOR PUSH-ON BELL-TYPE PIPE JOINT

[76] Inventor: Paul V. Metcalfe, 3501 Oxmoor Industrial Blvd., Dothan, Ala. 36303

[21] Appl. No.: 392,229

[22] Filed: Aug. 10, 1989

[51] Int. Cl.⁵ .............................................. F16L 13/02
[52] U.S. Cl. ..................................... 285/286; 285/81; 285/337
[58] Field of Search ................... 285/81, 337, 286, 256

[56] References Cited

U.S. PATENT DOCUMENTS

| | | | |
|---|---|---|---|
| 1,072,736 | 9/1913 | Kelly. | |
| 1,299,398 | 4/1919 | Coleman | 285/286 X |
| 2,101,894 | 12/1937 | Boughton | 285/337 X |
| 3,495,853 | 2/1970 | Furrer | 285/81 |
| 3,701,548 | 10/1972 | McGuire | 285/81 |
| 4,648,631 | 3/1987 | Bryant | 285/337 X |

Primary Examiner—Randolph A. Reese
Assistant Examiner—Carol I. Bordas
Attorney, Agent, or Firm—John L. Gray

[57] ABSTRACT

A connector for use in connecting a push-on bell-type pipe joint together which comprises two legs positioned at right angles to each other, one of which may be welded to the surface of the male member and the other of which may be welded to the edge of the bell of the female member, the leg attached to the male member being rotated so that the other leg being attached to the female member will readily engage the female member.

6 Claims, 1 Drawing Sheet

CONNECTOR FOR PUSH-ON BELL-TYPE PIPE JOINT

BACKGROUND OF THE INVENTION

Cast ductile iron pipe which is used for water mains generally utilizes joints which are designed to seal but allow flexibility in the joint. These joints do not keep the pipe from separating longitudinally. The pipe will separate any time there is a change in direction of the water flow, if the pressure is changed in the case of a valve or a fire hydrant being turned off, or if there is a pressure surge caused by a pump being turned on. Most of the pipe used for this purpose is plain on one end and belled with a gasket on the other end and commonly called "push-on". The plain male member fits into the gasket which is placed inside the bell of the next member.

Approximately fifty percent of pipe six inches in diameter and below is made of plastic, usually polyvinylchloride, with the balance being ductile iron. For pipe from 8 inches in diameter up to 16 inches in diameter, the percentage of ductile iron increases. At above 16 inches in diameter no plastic pipe used.

In order to keep this type of pipe joint from separating various devices have been developed which usually employ tie-rods which are mechanically secured to the male member and the female member to hold them together. These are expensive and difficult to install in the field. In some cases they will slip and there are many cities that will not allow their use because in some cases they have bent to the point that the gasket has leaked.

Another technique that is used to hold pipe joints together is to pour concrete around the joint. This is very expensive because of the cost of concrete and the labor involved. Also it is not possible readily to move or change the joint at a later date.

SUMMARY OF THE INVENTION

This invention involves the use of a fitting having two legs positioned at right angles to each other, one leg of which may be welded to the male member and the other leg of which is welded to the lip of the female member. At least the leg which may be welded to the male member should be circular in diameter. One size of this fitting will fit all diameters of pipe. It is not possible to do this with the fittings that are now on the market. The leg of the fitting which is welded to the male member may be rotated as necessary prior to welding to insure that the other leg will be in contact with the open end of the bell portion of the female member. Thus, the other leg can be firmly attached thereto regardless of the actual space between the exterior of the male member and the interior of the female member forming the joint. In smaller diameter pipe, only one fitting is necessary. As the diameter of the pipe increases, two fittings can be adequate, and in some cases three fittings spaced at 120 degrees around the pipe is all that will be necessary. In larger pipe, sixteen inches and above, more fittings are needed.

It is therefore, one object of this invention to provide a simple means for holding push-on bell-type pipe joints in place.

It is a further object of this invention to provide such a fitting which may be positioned to secure such pipe joints together regardless of the diameter of the pipes.

These, together with other objects and advantages of the invention will become more readily apparent to those skilled in the art when the following general statements and descriptions are read in light of the appended drawings.

DETAILED DESCRIPTION OF THE INVENTION

Figure 1:
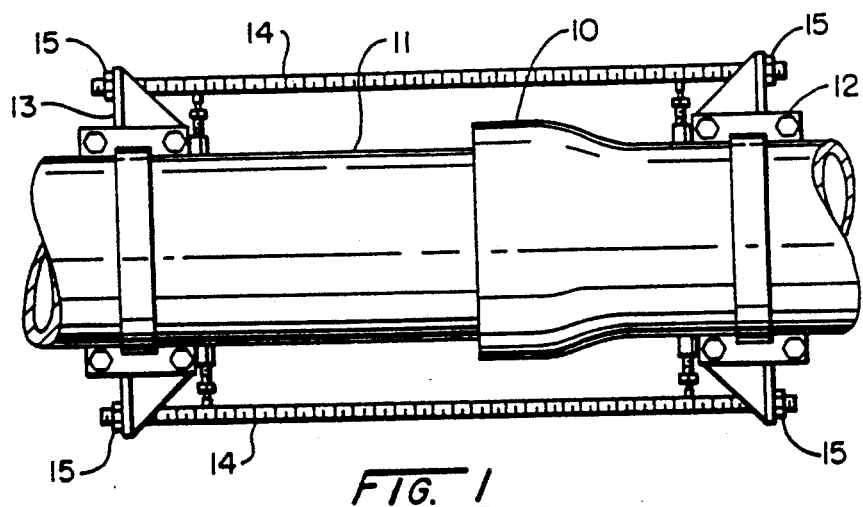
FIG. 1 illustrates a typical mechanical device of the prior art for holding a bell joint together.

Referring more particularly to FIG. 1 showing the prior art, the female bell joint 10 is shown with the male member 11 inserted therein. Attached to the female member is a mechanical sleeve 12 and a similar mechanical sleeve 13 is attached to the male member 11. The sleeves 12 and 13 are frictionally clamped onto the two pipes and are connected together by rods 14—14 which may be placed in tension by tightening the nuts 15—15, thus holding the joint in place.

Figure 2:
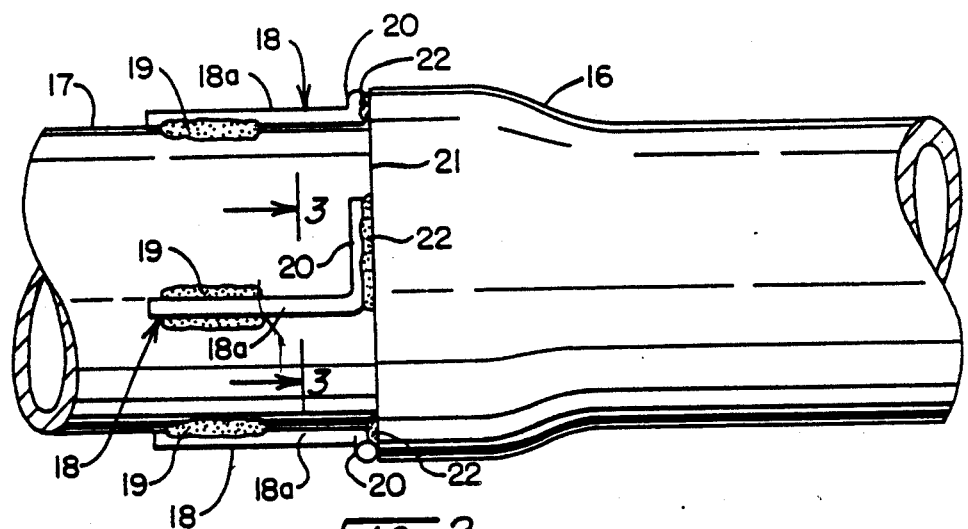
FIG. 2 is a side elevation view of a pipe joint showing applicants invention.
Figure 3:
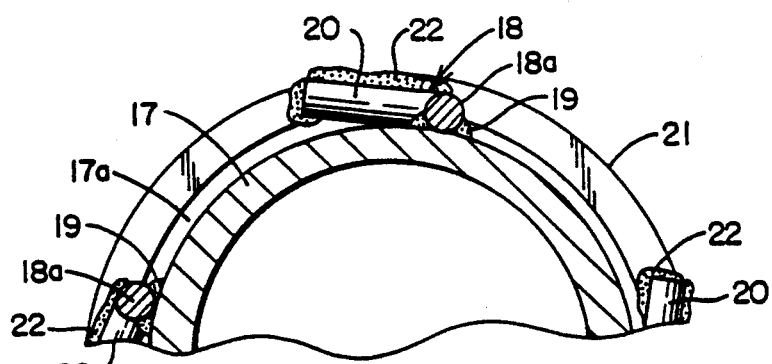
FIG. 3 is a Section of FIG. 2 on the Section 3—3.

Referring now more particularly to FIG. 2, the female member of the bell joint is shown at 16 with the male member 17 inserted therein into a gasket 17a positioned inside the female member. Connectors shown generally at 18 are attached to the male member 17 by weldments 19—19 firmly attaching one leg 18a, preferably the longer leg of the connector 18 to the male member 17. The other leg 20 of the connector 18 is firmly attached to the edge 21 of the female member 16 by means of weldments 22—22. Depending upon the diameter of the male and female members and the spacing between the bell portion of the interior diameter of the female member and the exterior of the male member the longer leg 18a of connector 18 may be rotated so that the shorter leg 20 is always in contact with the base 21 of the open end of the female member 16. Thus, one size of connector 18 may be used to connect any diameter of cast ductile pipe regardless of the spacing between the interior of the bell portion of the female member 16 and the exterior of the male member 17. Preferably the connector has a diameter of approximately ⅝ of an inch with one leg being longer and approximately 5 inches long and the shorter leg being 3 inches long. Preferably, the connectors are made of ASTM A242-81 metal, commonly called "Cor-Ten ®", a registered trademark of USX.

The instant invention enables a secure joint to be achieved with a minimum of effort and will fit any diameter, metal, bell-joint type pipe, regardless of the spacing between the interior diameter of the bell portion of the female member and the exterior diameter of the male member. Furthermore, while the installation is permanent it can be readily be removed by cutting with a torch or a saw. The connector 18 is installed after the pipe is assembled in the field and involves a minimum of time and labor in assembling.

While this invention has been described in its preferred embodiment, it is to be appreciated that variations therefrom may be made without departing from the true scope and spirit of the invention.

What is claimed:

1. A push-on bell-type pipe joint comprising:
a male member,
a gasket surrounding said male member, a female member provided with an enlarged open end having an inside diameter greater than the outside diameter of said male member and surrounding said gasket and said male member, with said male member and said gasket inserted snugly into the enlarged open end of said female member, at least one connector having only a first leg and only a second leg disposed at right angles to each other, means for attaching said first leg to the exterior of said male member adjacent to but exterior of said female member, said first leg having its longitudinal axis parallel to the longitudinal axis of said male member, means for attaching said second leg to the peripheral end of said enlarged open end of said female member exterior of said female member.

2. The pipe joint of claim 1 wherein at least said first leg of said connector is circular in cross section.

3. The pipe joint of claim 1 wherein said means for attaching said first leg to the exterior of said male member and the means for attaching said second leg to said enlarged open end of said female member are weldments.

4. The pipe joint of claim 1 wherein said first leg and said second leg of said connector are circular in cross section.

5. A connector for use in connecting a push-on bell-type pipe joint having a male member, a gasket surrounding said male member, a female member provided with an enlarged open end having an inside diameter greater than the outside diameter of said male member and surrounding said gasket and said male member, with said male member and said gasket inserted snugly in the enlarged open end of said female member, said connector comprising only a first leg and only a second leg disposed at right angles to each other, at least said first leg being circular in cross section and of a minimum diameter such that said first leg may be attached to the exterior of said male member adjacent to but exterior of said female member with the longitudinal axis of said first leg parallel to the longitudinal axis of said male member and said second leg being of a length that it may be attached to the peripheral end of the enlarged open end of said female member exterior of said female member.

6. The connector of claim 5 wherein said connector is of a size, shape and made of a material whereby said first leg may be attached to said male member and said second leg may be attached to the enlarged open end of said female member by weldments.

* * * * *